United States Patent
Verdegan et al.

(12) 
(10) Patent No.: US 6,422,395 B1
(45) Date of Patent: Jul. 23, 2002

(54) FILTER WITH PREFERENTIAL FLUID AFFINITY

(75) Inventors: Barry M. Verdegan, Stoughton; Brian W. Schwandt, Fort Atkinson; Daniel R. Cady, Madison, all of WI (US); Gene A. Mullins; W. Lee Currier, both of Cookeville, TN (US)

(73) Assignee: Nelson Industries Inc., Stoughton, WI (US)

( * ) Notice: Subject to any disclaimer, the term of this patent is extended or adjusted under 35 U.S.C. 154(b) by 0 days.

(21) Appl. No.: 09/480,748

(22) Filed: Jan. 10, 2000

(51) Int. Cl.$^7$ .................. B01D 39/16; B01D 39/04; B01D 29/62; B01D 29/21
(52) U.S. Cl. ................ 210/411; 210/444; 210/491; 210/503; 210/505; 210/508; 210/DIG. 17
(58) Field of Search ................. 210/411, 503, 210/505, 508, 491, 444, DIG. 17

(56) References Cited

U.S. PATENT DOCUMENTS

| | | |
|---|---|---|
| 3,209,520 A | 10/1965 | McKinlay |
| 3,386,230 A | 6/1968 | Reisberg et al. |
| 3,397,793 A | 8/1968 | MacDonnell |
| 4,058,463 A | 11/1977 | Bartik |
| 4,190,533 A | 2/1980 | Hirs |
| 4,464,263 A | 8/1984 | Brownell |
| 4,539,107 A | 9/1985 | Ayers |
| 4,692,175 A | 9/1987 | Frantz |
| 4,765,833 A | 8/1988 | Narumiya et al. |
| 4,878,929 A | 11/1989 | Tofsland et al. |
| 4,890,444 A | 1/1990 | Vander Geisen et al. |
| 5,006,235 A | 4/1991 | Cooper |
| 5,019,260 A | 5/1991 | Gsell et al. |
| 5,071,456 A | 12/1991 | Binder |
| 5,082,476 A | 1/1992 | Kahlbaugh et al. |
| 5,129,923 A | 7/1992 | Hunter et al. |
| 5,167,683 A | 12/1992 | Behrendt |
| 5,238,474 A | 8/1993 | Kahlbaugh et al. |

(List continued on next page.)

FOREIGN PATENT DOCUMENTS

| | | | |
|---|---|---|---|
| JP | 58-055010 | * | 4/1983 |
| JP | 62-142629 | * | 6/1987 |
| JP | 3-065207 | * | 3/1991 |
| JP | 7-204440 | * | 8/1995 |

*Primary Examiner*—Thomas M. Lithgow
(74) *Attorney, Agent, or Firm*—Andrus, Sceales, Starke & Sawall, LLP

(57) ABSTRACT

A filter is composed of filter media having the following characteristics in combination: a) the filter media has a greater affinity for the filtered fluid than for contaminants in the fluid, and wherein the work of adhesion between the filter media and the contaminants is less than the work of adhesion between the filter media and fluid, and wherein the filter media is preferentially wetted by the fluid relative to the contaminants; b) the filter media is composed of fibers having a defined surface area ratio facilitating fewer attachment sites for contaminants, and, in the case of cleanable reusable filters, facilitating cleansing backwash of the cleanable reusable filter by cleansing fluid along a reverse flow backflush path; c) the filter media has a thickness of 0.025 to 0.075 inch, 0.7 to 2.0 millimeters; d) the face area of the filter media is maximized by pleating the filter media and forming the pleated filter media into an annulus having an inner circumference and an outer circumference and having at least five pleats per inch along the inner circumference; e) the filter media is optionally provided with both upstream and downstream support layers preventing collapse of the thin surface filter media during both filtration and backwash, the support layers being pleated annular screens sandwiching the pleated filter media therebetween, the inner portions of the pleats of the downstream support layer screen adjacent the inner circumference preventing blinding.

7 Claims, 4 Drawing Sheets

U.S. PATENT DOCUMENTS

| | | |
|---|---|---|
| 5,252,207 A | 10/1993 | Miller et al. |
| 5,306,321 A | 4/1994 | Osendorf |
| 5,364,456 A | 11/1994 | Kahlbaugh et al. |
| 5,376,278 A | 12/1994 | Salem |
| 5,415,676 A | 5/1995 | Tokar et al. |
| 5,423,892 A | 6/1995 | Kahlbaugh et al. |
| 5,427,597 A | 6/1995 | Osendorf |
| 5,454,858 A | 10/1995 | Tokar et al. |
| 5,462,679 A | 10/1995 | Verdegan et al. |
| 5,543,047 A | 8/1996 | Stoyell et al. |
| 5,622,537 A | 4/1997 | Kahlbaugh et al. |
| 5,669,949 A | 9/1997 | Dudrey |
| 5,672,399 A | 9/1997 | Kahlbaugh et al. |
| 5,690,765 A | 11/1997 | Stoyell et al. |
| 5,695,637 A | 12/1997 | Jiang et al. |
| 5,736,044 A | 4/1998 | Prouix et al. |
| 5,762,669 A | 6/1998 | Kahlbaugh et al. |
| 5,762,670 A | 6/1998 | Kahlbaugh et al. |
| 5,779,900 A | 7/1998 | Holm et al. |
| 5,792,227 A | 8/1998 | Kahlbaugh et al. |
| 5,797,973 A | 8/1998 | Dudrey et al. |
| 5,800,581 A | 9/1998 | Geilink et al. |
| 5,800,587 A | 9/1998 | Kahlbaugh et al. |
| 5,814,219 A | 9/1998 | Friedmann et al. |
| D402,361 S | 12/1998 | Nepsund et al. |
| D404,807 S | 1/1999 | Nepsund et al. |
| 5,858,044 A | 1/1999 | Nepsund et al. |
| 5,858,224 A | 1/1999 | Schwandt |
| 5,871,557 A | 2/1999 | Tokar et al. |
| D406,315 S | 3/1999 | Rao et al. |
| D406,316 S | 3/1999 | Rao et al. |
| 5,876,601 A | 3/1999 | Geibel et al. |
| D407,808 S | 4/1999 | Nepsund et al. |
| 5,935,284 A | 8/1999 | Tokar et al. |

\* cited by examiner

FILTER WITH PREFERENTIAL FLUID AFFINITY

BACKGROUND AND SUMMARY OF THE INVENTION

The invention relates to fluid filters with extended life, including cleanable reusable filters and disposable filters.

Customers are demanding ever increased filter life, even as fluid quality declines and soot/sludge levels rise with extended service intervals, including internal combustion engine lubricating oil applications, and including other applications involving lubricant, fuel, coolant, hydraulic fluid, water, liquid and air. The present invention addresses this need and provides a simple effective solution, including both for conventional single stage filters and for combination filters having a full-flow section and a bypass section.

The invention arose during initial development efforts relating to cleanable reusable fluid filters. During continuing development efforts, it has been found that the invention also has application to disposable fluid filters.

DETAILED DESCRIPTION OF THE INVENTION PRIOR ART

Figure 1:
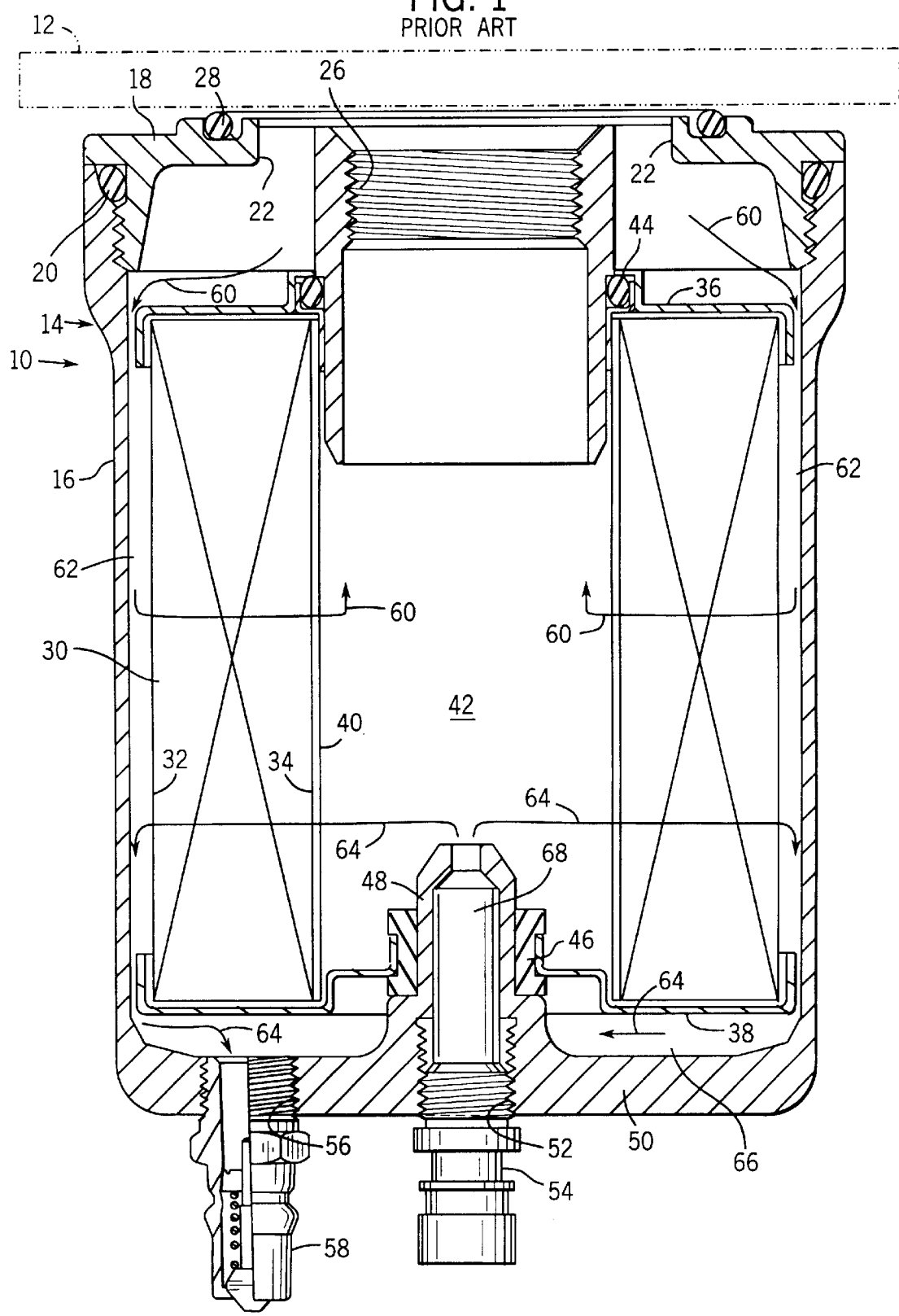
FIG. 1 is sectional view illustrating a cleanable reusable filter known in the prior art, and is similar to FIGS. 4 and 5 of U.S. Pat. No. 5,779,900, incorporated herein by reference.
Figure 2:
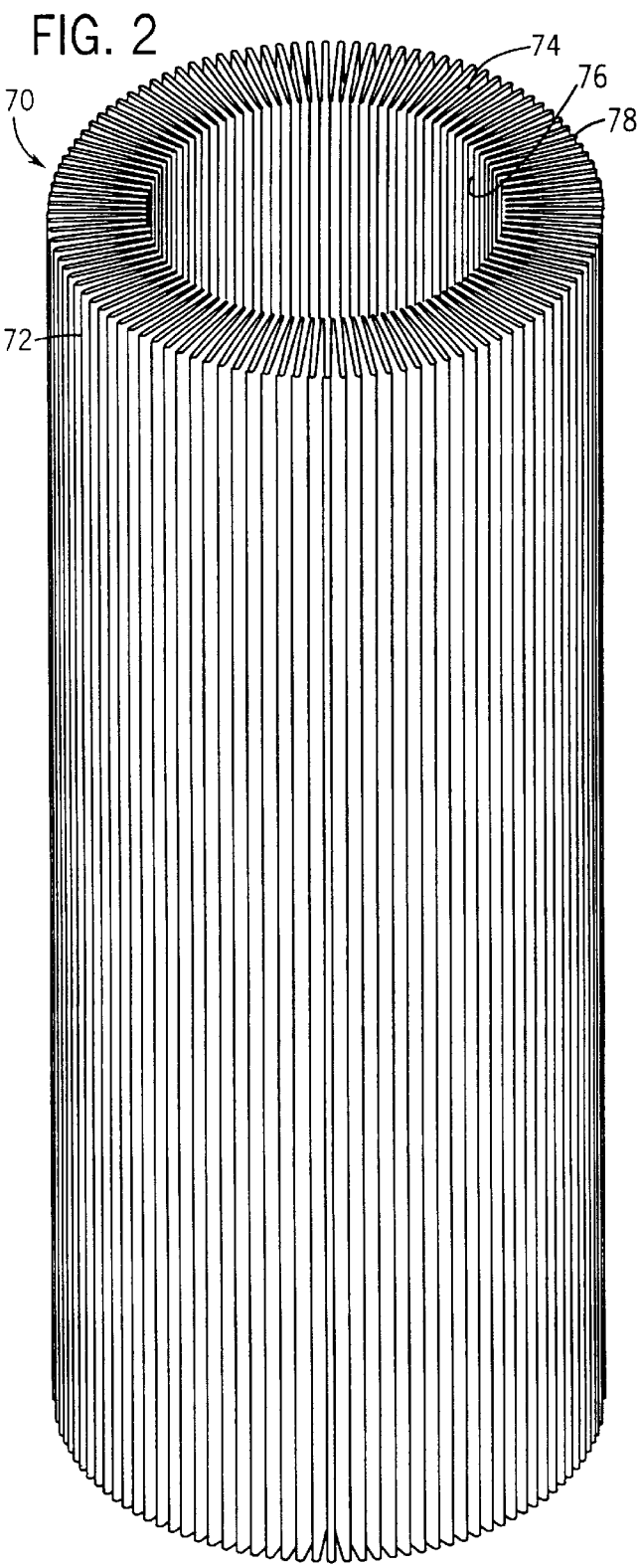
FIG. 2 is a perspective view of an annular pleated filter element in accordance with the invention, and which may be used in the cleanable reusable filter of FIG. 1 and in other filters.

FIG. 1 shows a filter 10 for filtering fluid, such as lubricating oil, from a machine 12, such as an internal combustion engine. Filter housing 14 includes an open-topped cylindrical canister 16 closed by threaded adapter plate 18 in sealing relation at O-ring 20. Adapter plate 18 has a plurality of circumferentially spaced openings 22 providing inlets for receiving fluid from machine 12, for example, engine oil, and having an outlet 26 for returning the fluid to the machine. Outlet 26 is internally threaded for mounting to a mounting boss of an internal combustion engine as is standard. The filter housing at adapter plate 18 is mounted to the engine block in sealing relation at O-ring 28. Mounted within the housing is a fluid filter element 30 provided by pleated filter media having an upstream dirty side 32 and a downstream clean side 34 and filtering fluid passing therethrough from upstream side 32 to downstream side 34 as is standard. The pleated filter media is potted between end caps 36 and 38, and includes an inner perforated metal liner 40 engaging and supporting the inner pleat tips and defining hollow interior 42 of the filter. Upper end cap 36 is sealed to the adapter plate at O-ring 44. Lower end cap 38 is sealed at grommet 46 to a central upstanding stud portion 48 extending axially upwardly from lower end 50 of the housing. The filter housing has a central lower threaded inlet 52 receiving air inlet valve 54 in threaded relation. The filter housing has a lower threaded outlet 56 receiving a drain valve 58 in threaded relation, all as in the noted incorporated U.S. Pat. No. 5,779,900. As noted in the incorporated '900 patent, the filter housing has a first flow path therethrough as shown at arrows 60 from inlets 22 then flowing downwardly through outer annular passage 62 then flowing radially inwardly through pleated filter media element 30 then flowing axially upwardly through outlet 26. The filter housing has a second flow path therethrough as shown at arrows 64 flowing from inlet 52 axially upwardly into hollow interior 42 then radially outwardly and then downwardly through outer annular passage 62 to lower collection chamber 66 to outlet 56 and through drain valve 58. During normal filtering operation during running of the engine, lubricating oil flows along the noted first flow path 60 and is filtered and returned to the engine. After the engine is turned off, a cleaning cycle can be initiated by introducing a cleansing fluid such as air at inlet valve 54 such that air flows along the noted second flow path 64 to backflush and clean pleated filter element 30. An auxiliary filter element 68 within stud portion 48 filters the cleansing fluid such as air. The above describe structure and operation is known in the prior art, for which further reference may be had to the noted incorporated '900 patent.

PRESENT INVENTION

FIGS. 2–5 show a filter element 70 in accordance with the invention and which may be utilized as filter element 30 in FIG. 1. Filter element 70 is provided by pleated filter media 72 formed into an annulus 74 having an inner circumference 76 and an outer circumference 78. It has been found that the life of filter element 70 can be significantly extended by utilizing filter media 72 with particular characteristics in combination, in cleanable reusable fluid filter applications such as shown in FIG. 1.

Figure 4:
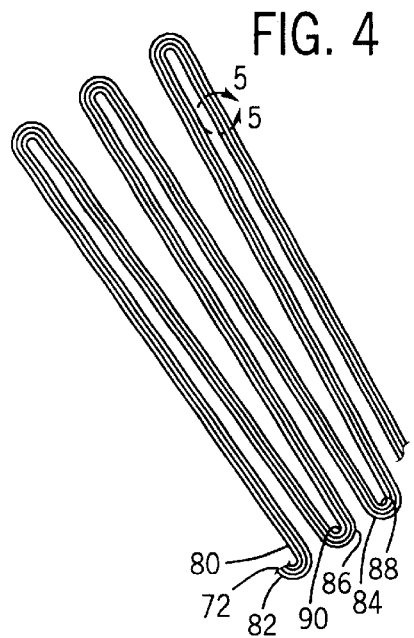
FIG. 4 is an enlarged view of a portion of the filter element of FIG. 3 as shown at lines 4—4.
Figure 5:
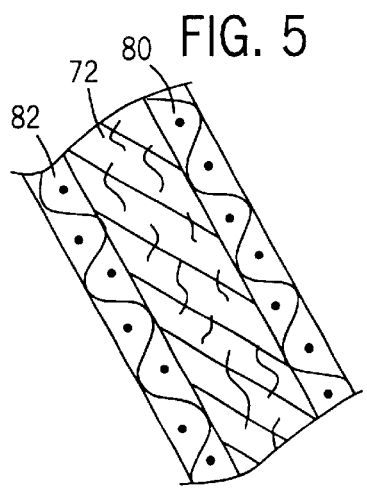
FIG. 5 is an enlarged view of a portion of the filter element of FIG. 4 as shown at lines 5—5.
Figure 3:
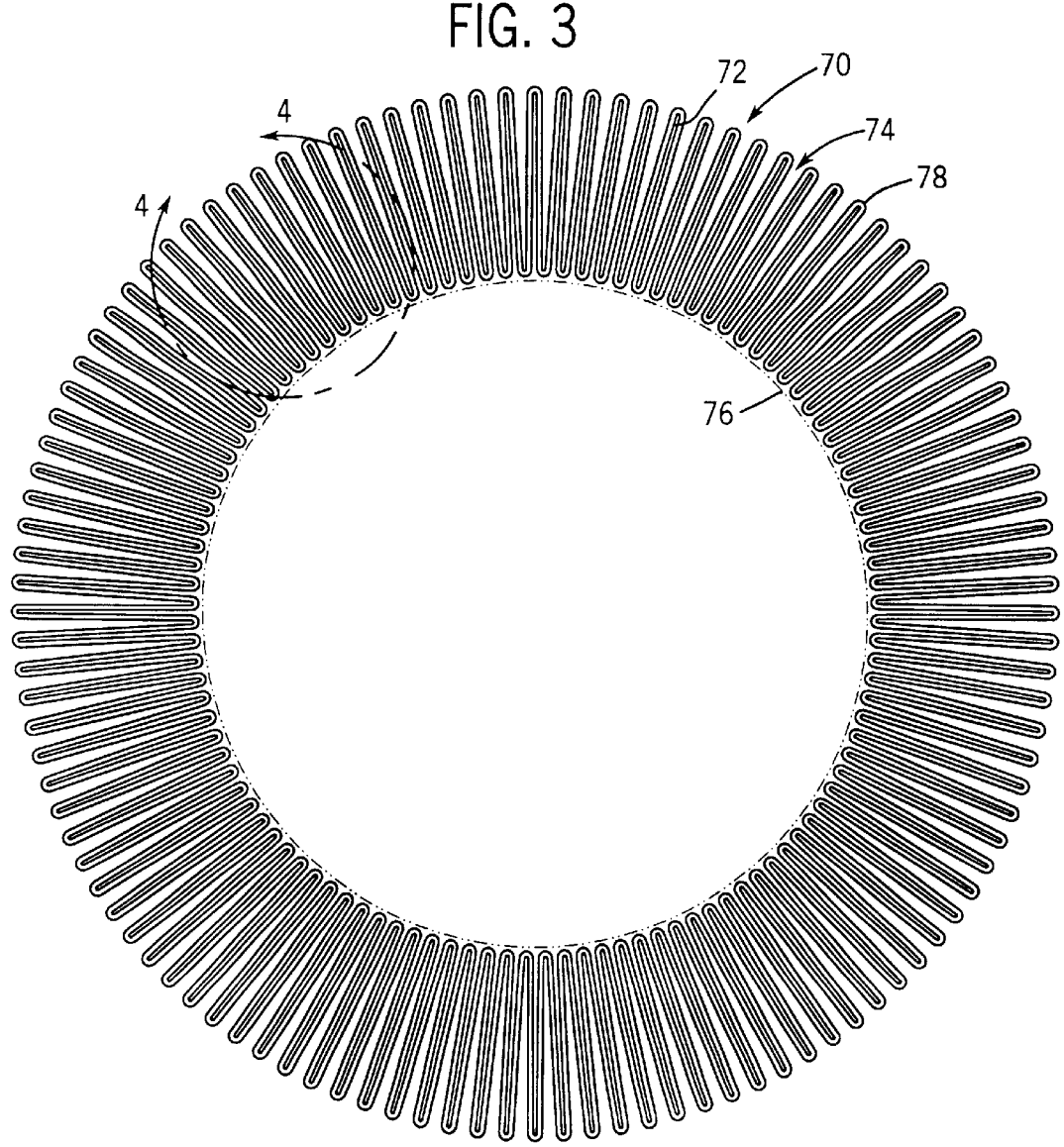
FIG. 3 is an enlarged end view of the filter element of FIG. 2.

In preferred form, filter element 70 is composed of filter media 72 characterized by the following five conditions in combination:

a) filter media 72 has a greater affinity for the fluid, such as lubricating engine oil, than for the contaminants, such as soot/sludge, etc., and wherein the work of adhesion between the filter media and the contaminants is less than the work of adhesion between the filter media and the fluid, and wherein the filter media is preferentially wetted by the fluid relative to the contaminants;

b) filter media 72 is composed of fibers having a defined surface area ratio providing fewer attachment sites for contaminants, facilitating cleansing backwash of the cleanable reusable filter by cleansing fluid, such as air, along the noted second path 64, the defined surface area ratio being the ratio of actual surface area of the fiber to the theoretical minimum surface area, for example π times diameter times length for a cylindrical fiber, or twice the height plus twice the width which sum is multiplied by the length for a rectangular fiber, such defined surface area ratio being less than ten, and preferably less than two;

c) filter media 72 is preferably surface filter media, further facilitating the noted cleansing backwash, the thickness of filter media 72 preferably being 0.7 to 2.0 millimeters, about 0.025 to 0.075 inch, and further preferably about 0.7 millimeter, about 0.025 inch;

d) the face area of filter media 72 is maximized by pleating filter media 72 and forming the pleated filter media into the noted annulus 74 having inner circumference 76 and outer circumference 78 and having preferably at least five pleats per inch along inner circumference 76, and further preferably eleven pleats per inch along inner circumference 76, the thin surface filter media 72, as opposed to thick depth media or gradient density media, facilitating the high pleat density per inch along inner circumference 76;

e) filter media 72 is provided with both upstream and downstream support layers 80 and 82, FIGS. 4, 5, preventing collapse of the thin surface filter media 72 during filtration, flow path 60 in FIG. 1, and during backwash, flow path 64 in FIG. 1, the support layers 80 and 82 being screens which are pleated and each formed into an annulus, which pleated annular screens 80 and 82 sandwich pleated filter media 72 therebetween, the inner portions 84 and 86, FIG. 4, of the pleats of downstream support layer 82 adjacent inner circumference 76 along inner liner 40 preventing blinding of respective inner pleat tips 88 and 90 of pleated filter media 72 against each other and insuring a circumferential gap therebetween, the support layer screens preventing blinding regardless of the direction of flow, i.e. filtration along path 60 or backwash along path 64, and preventing blinding along other portions of the pleats of the filter media, not just the inner pleat tips, each screen being formed by criss-crossed wires, each wire having a diameter of 0.007 inch, 0.18 millimeter, to thus provide a screen thickness of twice such diameter as the wires cross, namely 0.014 inch, 0.36 millimeter, which in turn provides a circumferential spacing between inner pleat tips 88 and 90 of 0.028 inch, 0.71 millimeter, since there are two layers of screen 82 between inner pleat tips 88 and 90. In the noted embodiment, the pleat depth, i.e. the radial distance between inner circumference 76 and outer circumference 78, is 0.8 inch, 20.4 millimeters, and the diameter of inner circumference 76 is 2.5 inch, 64 millimeters. In further embodiments, one or both of screens 80 and 82 may be eliminated if the media has sufficient structural strength, examples being laminated filter media, stiffer layer filter media, resin impregnated filter media, and the like.

In the preferred embodiment, filter media 72 is polyphenylene sulfide, PPS. In another embodiment, filter media 72 is aliphatic-aromatic polyamide. In another embodiment, filter media 72 is polyester. In further embodiments, filter media 72 may be surface treated, for example with silicone, phenolic coatings, fluorocarbon, or the like, to attain the desired affinity. In further embodiments, the surface of filter media 72 may be modified by surface modification techniques, such as plasma treatments, heating, and the like, to achieve the desired affinity.

Figure 6:
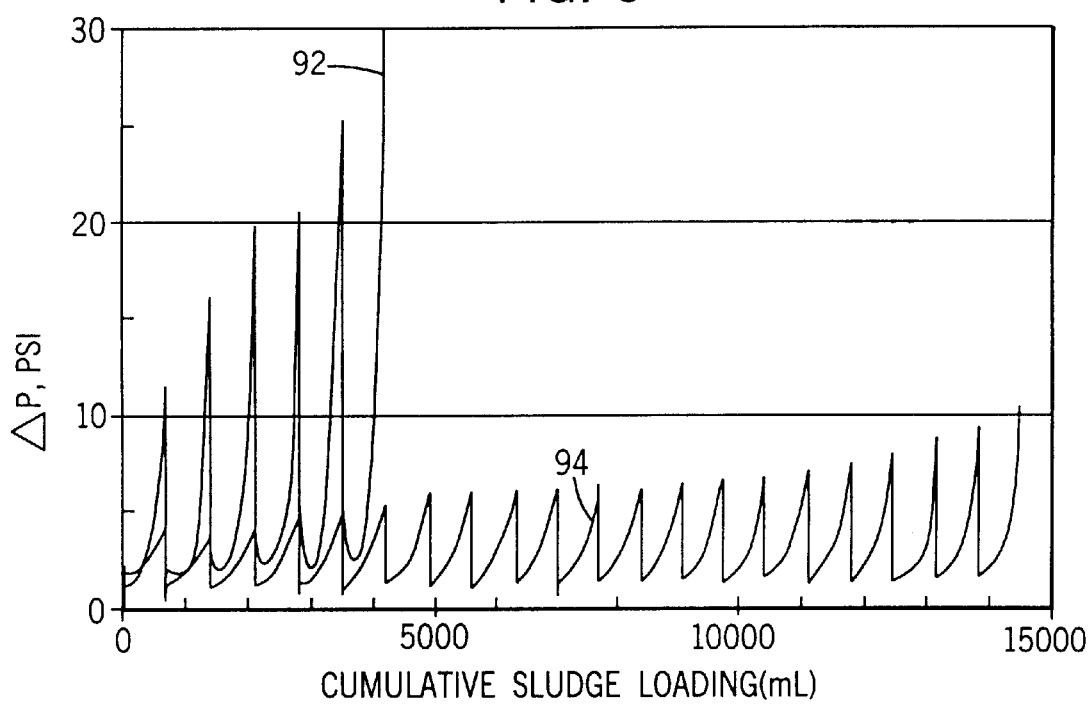
FIG. 6 is a graph showing filter performance for a cleanable reusable filter.

In the noted engine lubricating oil application, the performance graph in FIG. 6, shows on the Y-axis the filter element pressure drop $\Delta P$ in pounds per square inch, psi, and on the X-axis the cumulative sludge loading volume in milliliters, mL. Curve 92 shows the progressively increasing pressure drop across a fiberglass test media section, which pressure drop reaches 30 psi after five cleaning cycles, i.e. fluid filtration along flow path 60, FIG. 1, followed by backflush along flow path 64. Curve 94 shows the pressure drop across a PPS test media section, and it is seen that the pressure drop is significantly less even after a substantially greater number of cleaning cycles, for example the pressure drop does not even rise to 10 psi until after the twentieth cleaning cycle. This provides a cleanable reusable filter with substantially extended life, i.e. a substantially greater number of cleaning cycles before objectionable pressure drop levels are reached which would cause filter plugging.

Figure 7:
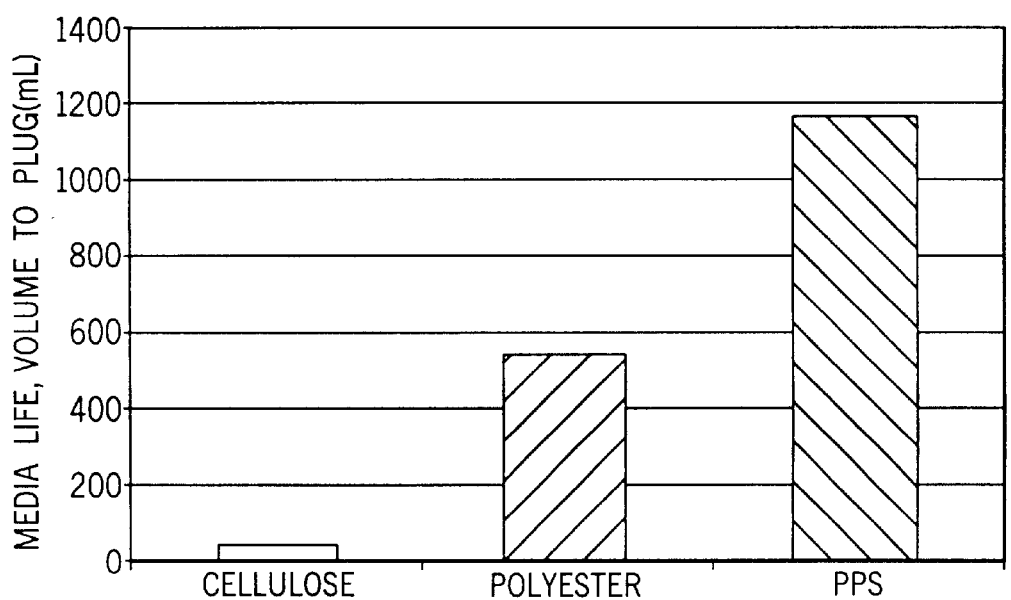
FIG. 7 is a graph showing filter performance for a disposable filter.

During continuing development efforts, it has been found that the above noted principles providing desirable performance advantages for cleanable reusable filters also find application in disposable filters, where there is no cleaning cycle as in FIG. 6. It has been found that filter media having a greater affinity for the fluid to be filtered than for the contaminants therein provides extended life. In accordance with this finding, the invention has application to numerous fluid filter elements for filtering contaminants in fluid flowing therethrough, the fluid filter element comprising filter media having a greater affinity for the fluid than for the contaminants. This is shown in the performance graph in FIG. 7, showing on the X-axis filter materials, including cellulose, polyester, and PPS, and on the Y-axis filter media life in terms of volume in milliliters, mL, to plug, i.e. filter plugging. The comparative testing results shown in FIG. 7 indicate that the desirable performance advantages provided by the noted filter media in cleanable reusable filters as noted above also provide desirable performance advantages in terms of extended life in other filters even if there is no cleaning cycle and re-use, i.e. in disposable filters.

The extended life characteristics of the filter media noted above are applicable to filters for filtering various fluids, including fuel, coolant, hydraulic fluid, water, liquid and air, in addition to lubrication oil. The above noted affinity relationship provides extended filter life in these and other filter applications.

It is recognized that various equivalents, alternatives and modifications are possible within the scope of the appended claims.

What is claimed is:

1. A fluid filter element for filtering contaminants in fluid flowing therethrough comprising filter media having a greater affinity for said fluid than for said contaminants, wherein said filter media is characterized by the following conditions in combination:

a) said filter media has a greater affinity for said fluid than for said contaminants;

b) the work of adhesion between said filter media and said contaminants is less than the work of adhesion between said filter media and said fluid,
wherein said filter media is composed of fibers having a defined surface area ratio less than ten, said defined surface area ratio being the ratio of actual surface area of said fiber to the theoretical minimum surface area of said fiber, said defined ratio minimizing the number of attachment sites for said contaminants.

2. A fluid filter element for filtering contaminants in fluid flowing therethrough comprising filter media characterized by the following conditions in combination:

a) said filter media has a greater affinity for said fluid than for said contaminants;

b) the work of adhesion between said filter media and said contaminants is less than the work of adhesion between said filter media and said fluid;

c) said filter media is composed of fibers having a defined surface area ratio less than ten, said defined surface area ratio being the ratio of actual surface area of said fiber to the theoretical minimum surface area of said fiber, said defined ratio minimizing the number of attachment sites for said contaminants;

d) said filter media comprises surface filter media having a thickness less than 2.0 millimeters.

3. A cleanable reusable fluid filter for filtering contaminants in fluid for a machine, comprising:

a filter housing having a first inlet receiving said fluid containing said contaminants, a first outlet outputting clean filtered fluid, a second inlet selectively receiving a cleansing fluid, and a second outlet exhausting said cleansing fluid;

a filter element in said filter housing;

said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter element comprising filter media characterized by the following conditions in combination:
   a) said filter media has a greater affinity for said fluid than for said contaminants;
   b) the work of adhesion between said filter media and said contaminants is less than the work of adhesion between said filter media and said fluid,
      wherein said filter media is composed of fibers having a defined surface area ratio less than ten, said surface area ratio being the ratio of actual surface area of the fiber relative to the theoretical minimum surface area of the fiber, said defined surface area ratio providing fewer attachment sites for contaminants and facilitating cleansing backwash of said cleanable reusable filter by said cleansing fluid along said second path.

4. A cleanable reusable fluid filter for filtering contaminants in fluid for a machine, comprising:

a filter housing having a first inlet receiving said fluid containing said contaminants, a first outlet outputting clean filtered fluid, a second inlet selectively receiving a cleansing fluid, and a second outlet exhausting said cleansing fluid;

a filter element in said filter housing;

said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter element comprising filter media characterized by the following conditions in combination:
   a) said filter media has a greater affinity for said fluid than for said contaminants;
   b) the work of adhesion between said filter media and said contaminants is less than the work of adhesion between said filter media and said fluid,
      wherein said filter media is further characterized by the following conditions in combination:
         a) said filter media is composed of fibers having a defined surface area ratio less than ten, said surface area ratio being the ratio of actual surface area of the fiber relative to the theoretical minimum surface area of the fiber, said defined surface area ratio providing fewer attachment sites for contaminants and facilitating cleansing backwash of said cleanable reusable filter by said cleansing fluid along said second path;
         b) said filter media comprises surface filter media having a thickness less than 2.0 millimeters, further facilitating said cleansing backwash.

5. A cleanable reusable fluid filter for filtering contaminants in fluid for a machine, comprising:

a filter housing having a first inlet receiving said fluid containing said contaminants, a first outlet outputting clean filtered fluid, a second inlet selectively receiving a cleansing fluid, and a second outlet exhausting said cleansing fluid;

a filter element in said filter housing;

said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter element being composed of filter media characterized by the following five conditions in combination:
   a) said filter media has a greater affinity for said fluid than for said contaminants;
   b) the work of adhesion between said filter media and said contaminants is less than the work of adhesion between said filter media and said fluid;
   c) said filter media is composed of fibers of defined surface area ratio less than ten, said surface area ratio being the ratio of the actual surface area of the fiber to the theoretical minimum surface area of the fiber, said defined surface area ratio facilitating fewer attachment sites for contaminants and facilitating cleansing backwash of said cleanable reusable filter by said cleansing fluid along said second path;
   d) said filter media has a thickness less than 2.0 millimeters, further facilitating said cleansing backwash; and
   e) the face area of said filter media is maximized by pleating said filter media and forming said filter media into an annulus having an inner circumference and an outer circumference and having at least five pleats per inch along said inner circumference.

6. The invention according to claim 5 wherein said filter media is provided with both upstream and downstream support layers preventing pleat collapse of the thin surface filter media during both filtration and backwash, said support layers comprising pleated annular screens sandwiching said pleated filter media therebetween, the inner portions of the pleats of the downstream support layer screen adjacent said inner circumference preventing blinding of said inner pleat tips of said pleated filter media against each other and ensuring a circumferential gap therebetween.

7. A fluid filter element for filtering contaminant in fluid flowing therethrough, said fluid being selected from the group consisting of engine lubricating oil, fuel, coolant, and hydraulic fluid, comprising filter media having a greater affinity for said fluid than for said contaminant, wherein the work of adhesion between said filter media and said contaminant is less than the work of adhesion between said filter media and said fluid, said filter media being composed of fibers having a defined surface area ratio less than ten, said defined surface area ratio being the ratio of actual surface area of said fiber to the theoretical minimum surface area of said fiber, said defined ratio minimizing the number of attachment sites for said contaminant.

\* \* \* \* \*